June 24, 1952 R. J. RAHN ET AL 2,601,630
ANGLE BLOCK AND METHOD OF MANUFACTURE
Filed July 2, 1947 3 Sheets-Sheet 3

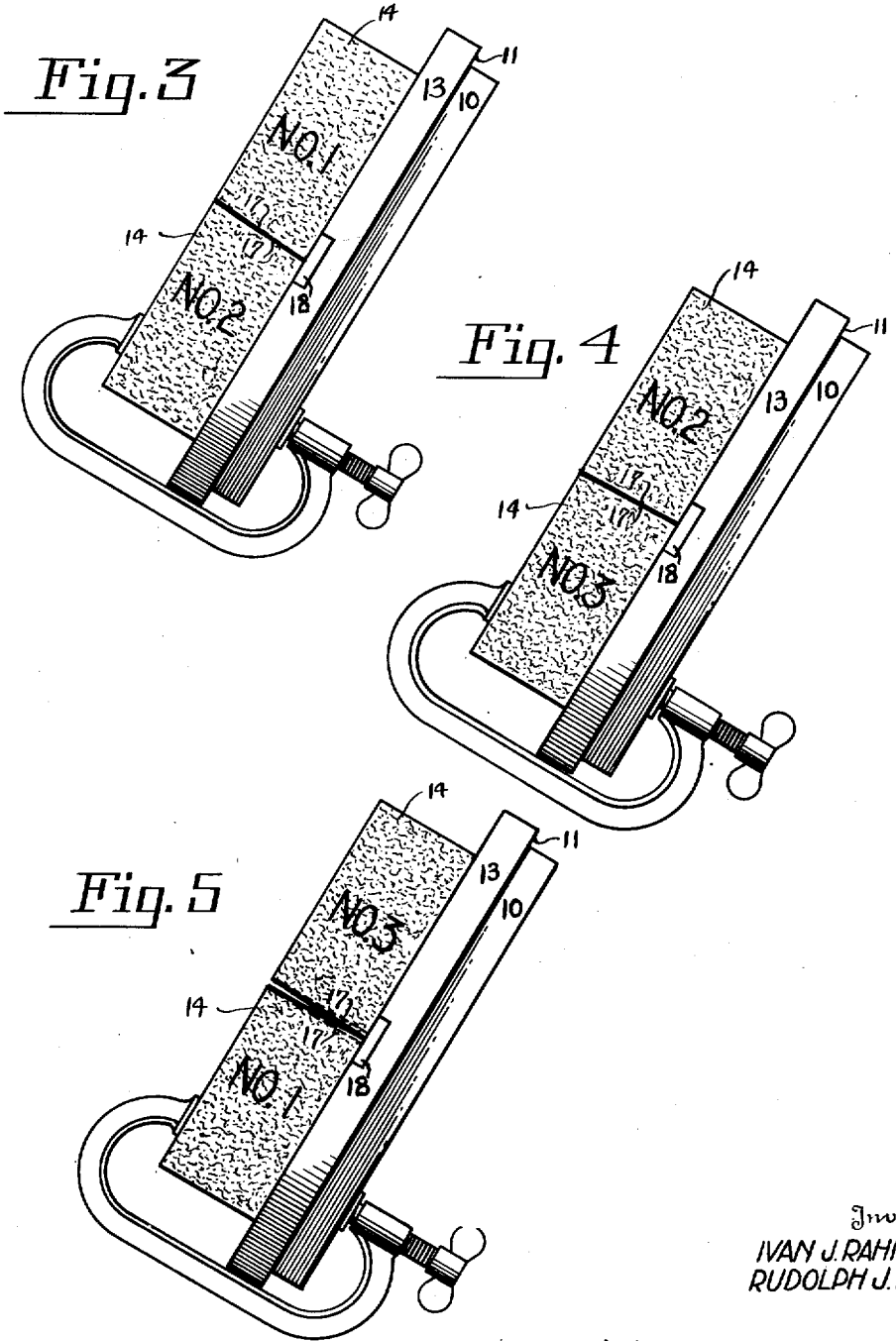

Inventor
IVAN J. RAHN
RUDOLPH J. RAHN
By Tom Walker
Attorney

Patented June 24, 1952

2,601,630

UNITED STATES PATENT OFFICE 2,601,630

ANGLE BLOCK AND METHOD OF MANUFACTURE

Rudolph J. Rahn and Ivan J. Rahn, Dayton, Ohio

Application July 2, 1947, Serial No. 758,658

6 Claims. (Cl. 51—156)

This invention pertains to precision angle blocks for gaging and test purposes, the inventive conception of making such test gages from a natural granite rock, and the herein described method of reducing a body of stock material to accurately contoured form. While various forms of granite rock may be utilized, which are known in different localities under various designations, an igneous rock, known commercially as "black granite" is a preferred form.

Angle blocks and surface plates with which they cooperate, have ordinarily been made from metal, but have been found subject to many objectionable and undesirable characteristics, including wear, warping, corrosion and rust, change of shape and loss of accuracy. An extremely hard, impervious, non absorbing stone such as igneous rock has been found greatly superior and more desirable for such purpose. The igneous black granite is some times known under other circumstances, as diabase, diorlite or gabbro.

Being, presumably, of volcanic origin and having been aged for millions of years under conditions of heat and pressure such rock material has been thoroughly seasoned and relieved of internal stresses and strains, the material is quite stable and will not warp nor change its shape under influence of shock or change of temperature or climatic conditions. Such granite which is harder than tool steel is permanent and will retain the accuracy of the gages and test elements formed therefrom and will not become charged with abrasive.

While the present inventive conception of utilization of natural granite rock and especially that of igneous character for production of accurately surfaced angular gage and test blocks and of the surface plates with which they are usable, involves distinctive change of material from that which gage and test elements have heretofore been made, it is a change which is productive of greatly improved results and much longer lasting accuracy.

The object of the invention is to provide angle blocks, gage and test elements by an improved method of procedure by which gage and test elements not only may be economically manufactured but will be more efficient and of increased accuracy in use, of greater durability, possessing a high degree of smoothness, offering minimum resistance to movement of the blocks or of instruments thereon, and unlikely to get out of repair.

A further object is to form such gage and test elements from a substance in which abrasive material will not become embedded and thus acquire lapping properties.

A further object of the invention is the utilization of a non-rusting substance and the complete elimination of high or low spots resulting from accumulation or removal of rust deposits as occurs on metal elements.

A further object of the invention is the utilization of a substance which will be substantially constant and will not change its form or loose its accuracy incident to shock or a violent bump occurring during shipment, which might induce warpage.

A further advantage is that in event of accidental formation of a dent by a blow or violent shock, a compensatory swelling or elevation of the adjacent surface, incident to displacement of material will not occur as results from such indentation in a metal surface, thus destroying the accuracy of a planar face.

A further object of the invention is the production of gage and test elements from a material possessing the advantageous structural advantages, the inherent meritorious characteristics and the mode of production herein described or their equivalents.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings or their equivalents.

In the drawings, shown for illustrative purposes:

Fig. 3 illustrates a side elevation of a pair of gage blocks arranged in cooperative relation with a surface plate comprising a step in the generation of accurately disposed faces upon the blocks.

Fig. 4 is a similar view showing arrangement of another pair of gage blocks, illustrating a further step in the process of development of angularly disposed faces thereon.

Fig. 5 is a succeeding like view of a different pair of the series of blocks, showing a further step in the angular face development.

Like parts are indicated by similar characters of reference throughout the several views.

Figure 1:
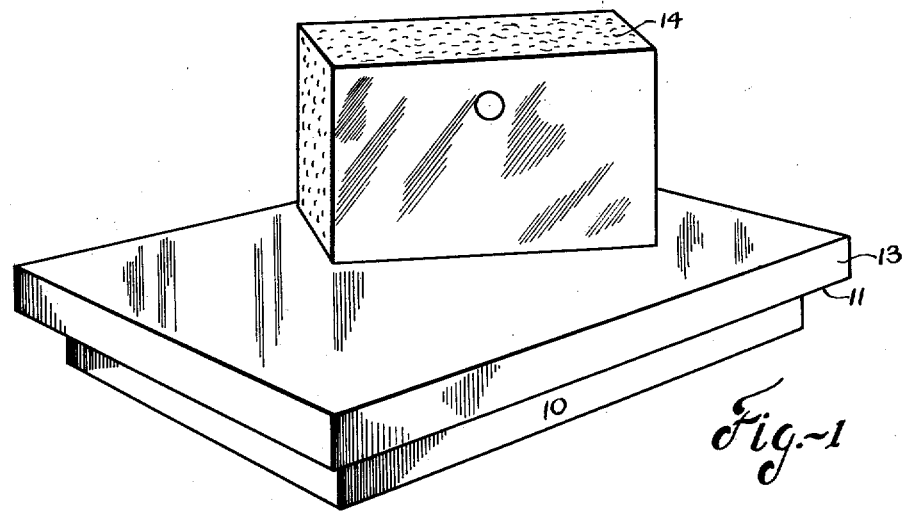
Fig. 1 is a perspective view of a surface plate and a cooperating angle block resting thereon constructed from igneous stone, embodying the present invention.
Figure 2:
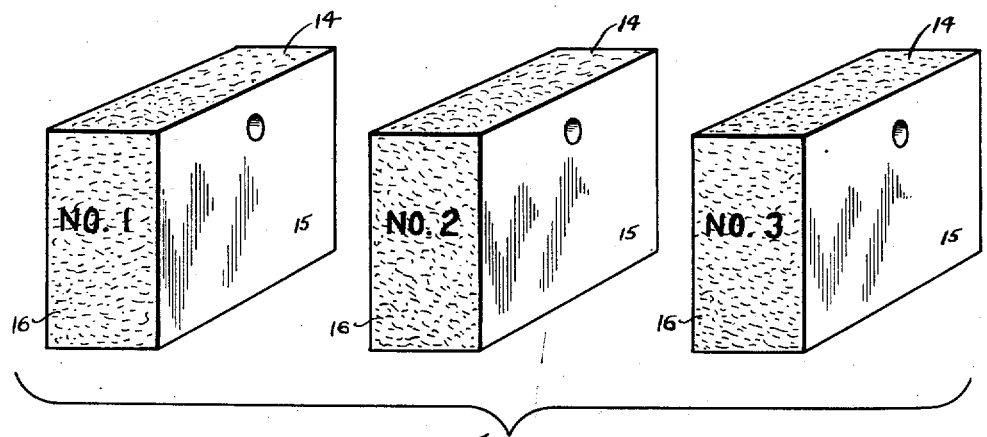
Fig. 2 illustrates three finished angular gage blocks, the visible vertical faces and the underlying horizontal finished planar faces of which are disposed at right angles to each other.

Referring to the drawings, 10 is a conventional surface plate ordinarily constructed from steel, but which in the present instance is formed from the igneous stone hereinbefore mentioned, preferably, but not necessarily, that commercially known as "black granite." The top face of the surface plate 10 is reduced to a true planar surface. The linear margins of the plate 10 are under cut at 11 to afford clamping lips 13 on opposite sides, or if desired on all four sides, for temporary attachment of work pieces or instruments.

In producing the angle blocks 14 of granite or igneous rock, one face 15 of each block, preferably but not necessarily, that of larger area, is first reduced to a planar surface. To assure accuracy the faces 15 of multiple blocks 14 are lapped successively one upon another, preferably in sets of three blocks, using therebetween abrasives of progressively decreasing degrees of fineness until the desired accuracy is attained. The remaining unfinished faces 16 are roughly reduced to symmetrical relation by surface grinding which removes excess material more rapidly than by the lapping process.

To produce a second face 17 upon each of the blocks in definite angular relation, as ninety degrees (90), to the finished surface 15, one of the blocks 14, for example, block No. 2 of Fig. 3 is fixedly clamped to the accurately finished face of a surface plate 10 provided with a transverse gutter or channel 18 in overlapping relation with the surface 17 of the block to be finished. The block 14 is secured with its planar finished face 15 in contact with the finished face of the surface plate 10. A mixture of abrasive in water is spread evenly upon the uppermost face 17 of the attached block No. 2 and upon the corresponding under face of a second block No. 1. The surface plate 10 with its gutter or channel 18 extending across the plane of contact between the blocks, is tipped or inclined at approximately thirty degrees (30°) to the vertical. The angle of the surface plate and the blocks 14 thereon may be varied through a rather wide range, sufficient that the movable block 14, shown as No. 1, Fig. 3, will exert sufficient pressure by gravity upon the surface plate to accurately conform to and be guided thereby. The superposed angle block, No. 1 of Fig. 3, is then moved to and fro with its under face 17 sliding back and forth upon the uppermost face 17 of the stationary block No. 2 until the respective faces are reduced by the interposed abrasive until they make complete contact. The excess slurry or abrasive working from between the blocks is received in the transverse channel or groove 18 thus preventing its entry between the face 15 of the sliding block No. 1 and the face of the surface plate. The angularity of the plane of contact preliminarily produced may depend somewhat upon the accuracy of the initial rough grinding. However the surface 17 produced upon one of the blocks by this process may be obtuse while that upon the other of the blocks may be acute, the respective angles being supplementary, totaling one hundred and eighty degrees. Thereafter as in Fig. 4, the block No. 3 may be fixedly clamped to the surface plate and the block No. 2 superposed thereupon with abrasive between. By rubbing the uppermost block No. 2, to and fro, the obtuse or acute angularity of the block No. 2, whichever it may be, is reduced to somewhat less angularity than before, and the corresponding upturned face of block No. 3 will be preliminarily surfaced.

Thereafter the block No. 1 is stationarily clamped with its initial accurately surfaced face 15 in contact with the surface plate and the block No. 3 is superposed thereon, as illustrated in Fig. 5, and the process repeated. The angular relation of the faces 17 when initially interengaged may be both obtuse or both acute. After being abraded one upon the other, the high portions of each will be worn down and both blocks will approach a common face by changing the acuity or obtuseness thereof as the case may be. The straight line to and fro abrasion of one block upon another while their previously finished faces 15 are guided by the face of the surface plate may develop longitudinal ridges on the faces being produced. To remove such ridges each pair of blocks before being rearranged in different pairs is lapped together again intermediate succeeding to and fro abrading operation with a circular motion, after being removed from engagement with the surface plate. This further operation is conducted in the usual manner of producing planar faces as in the production of the initial faces 15 and face of the surface plate.

By this sequence the face 17 of each block is subjected twice to abrasion or rubbing, each time with a different one of the remaining blocks of the series. This sequence of operations illustrated in Figs. 3, 4, and 5 is repeated over and over again with progressively finer abrasives therebetween until the desired degree of accuracy is achieved.

Finally the angular faces 17 of the respective blocks will assume right angle relation to their faces 15.

If so desired other faces 16 of the blocks may likewise be finished at ninety degrees (90°) to previously developed faces by securing finished faces in contact with the surface plate and repeating the process.

Figure 6:
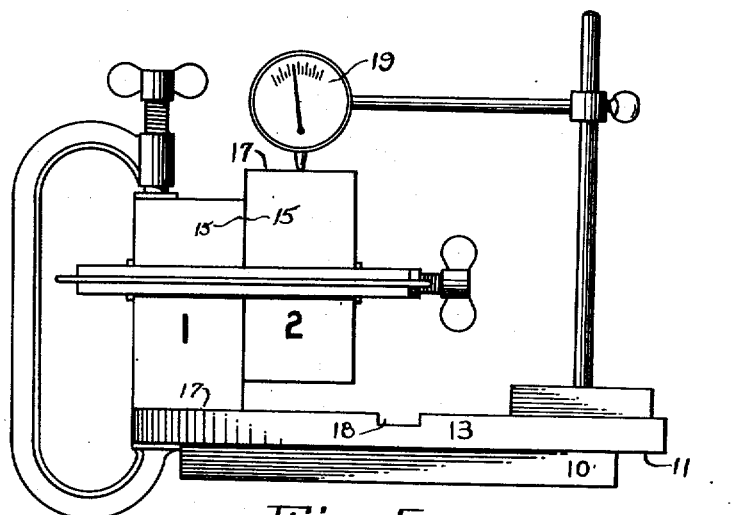
Figs. 6 and 7 are side elevations illustrating different modes of testing the accuracy of the horizontal and the vertical faces respectively of gage blocks and their angularity in relation to an accurately finished surface plate, by application of a surface test indicator.

In event an angle of less than ninety degrees (90°) is desired a plate having an angle of twice the difference of the degree of the face to be produced and ninety degrees is inserted between the finished face of one of the angle blocks and the surface plate. For example if the face 17 is to be developed at an angle of eighty degrees (80°) to the face 15, a plate or shim of twenty degrees angularity is inserted. The abrasive action of each of three blocks upon each of the other two blocks so mounted will result in bisecting the remaining angle of one hundred and sixty degrees (160°) and the faces developed on each of the blocks will be of eighty degrees (80°) instead of ninety degrees (90°). Obviously the accuracy of the developed angles will depend somewhat upon that of the inserted shim or plate. To test the accuracy of the ninety degree relation of the finished faces, one of the angle blocks is clamped with its face 17 contacting the face of the surface plate 10 and its face 15 perpendicular thereto. A second block is clamped to the first block in inverted position with their planar faces 15 in contact, as is illustrated in Fig. 6. A wedge is inserted beneath the unfinished under face of the inverted block so mounted until the angular edge of the intersecting faces 15 and 17 is parallel with the face of the surface plate. The face 17 of the second block is then checked with a surface test indicator 19, Fig. 6, which is moved to and fro over the upturned surface 17 of the second block, while simultaneously in contact with the surface plate. If the face 17 of the inverted block is found accurately parallel to the planar face of the surface plate 10, it conclusively indicates that the angle between the faces 15 and 17 of the second or inverted block is equal to the angle between the corresponding faces of the first block.

Figure 7:
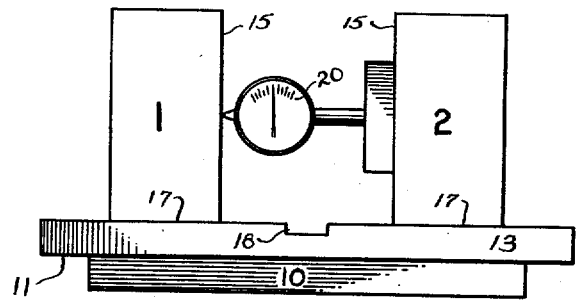

As a further test, a pair of blocks are rested in spaced relation on the surface plate 10 with their angular developed faces 17 in contact with the planar face of the surface plate. They are carefully adjusted accurately into parallel relation of their angular edges. A surface test indicator 20, Fig. 7, is interposed and moved about between their opposing faces 15 by which their degree of accuracy is determined. If the corresponding faces of the respective blocks are found accurately parallel, it conclusively demonstrates that the angles between the faces 15 and 17 of the respective blocks are supplementary. Since the first mentioned test determines that the angles of the respective blocks are equal and the second mentioned test determines that the angles of the respective blocks are supplementary, this is a condition which only corresponding angles of ninety degrees (90°) can produce.

Figure 8:
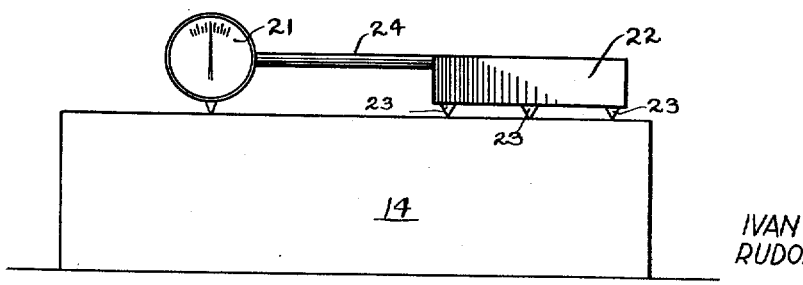
Fig. 8 illustrates a further mode of testing the accuracy of a planar surface of a block or plate by application of a surface test indicator, in different relation from that shown in the preceding figures.

To assure accuracy of the planar faces of the angle blocks 14 and of the surface plate 10, with which the blocks 14 are utilized a surface test indicator, such as shown at 21, Fig. 8, is moved to and fro over an area of the planar surface while a contact feeler thereon engages an adjacent area of the same surface.

The indicator 21 rests upon a trilegged support or base 22 having three studs or feet 23. The contact feeler and indicator are carried in laterally spaced relation, upon a beam 24, extending from the base 22.

Obviously any irregularity, either depression or elevation encountered by any one of the three studs or feet will effect vertical deflection of the beam and ample indication of such irregularity. Thus extreme accuracy of the planar surface may be assured.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. The herein described method of contouring and surfacing test and gage blocks of igneous rock consisting in fixedly attaching a previously surfaced block to a surface plate with a prefinished planar face thereof in contact relation with that of the surface plate, tipping the surface plate at an angle at which a second block to be surfaced will rest by gravity upon the attached block to greater pressure than upon the surface plate, introducing granular abrasive material between the contiguous faces of the attached and supported blocks and rub and abrade the contiguous face of the supported block upon the attached block in a direction guided by the contacting planar face of the movable block on the planar face of the surface plate.

2. A supporting and guide member of igneous rock, including a planar surface positioned at a degree of inclination removed less than forty degrees from vertical, a block of igneous rock material including two intersecting planar faces disposed at a predetermined angle to each other, means fixedly attaching to the igneous rock block to the igneous rock support and guide member with one of its planar faces in contact with the planar face of the support and guide member and its intersecting exposed planar face in predetermined angular relation with the planar face of the support and guide member, upon which a second block of igneous rock may rest under gravity while being rubbed and abraded upon the exposed face of the attached block in directions determined by the planar face of the support and guide member while reducing its contacting face to a corresponding planar surface.

3. A surface plate supported in inclined position, a stone block secured thereto, a second block resting upon the first block and in guiding contact with the face of the surface plate and movable to and fro, and a collecting groove or gutter in the face of the surface plate overlapping the contacting plane of the interengaging blocks into which surplus abrasive displaced from between the blocks will be received.

4. The herein described method, comprising securing a stone block having at least one planar surface with said surface in contact relation with a planar face of an inclined surface plate, disposing a second block also having at least one planar face in contact with the face of the inclined surface plate and resting on the first mentioned block for to and fro sliding motion while maintaining parallel contacting relation of the said second block with the face of the surface plate to produce contacting planar faces upon the respective blocks, introducing abrasive material between the blocks, moving said second block as described, and collecting excess abrasive material displaced from between the blocks, in a recess in the planar face of the surface plate overlapping the juncture between the stationary and movable blocks.

5. A pair of stone blocks, each having a planar face, one of the blocks being secured to an inclined surface plate with its planar face in contact with the face thereof, the other block of the pair resting upon the first block with its planar face in contact with the face of the surface plate, for to and fro rubbing action upon the first block guided by the contacting planar faces of the second block and the inclined surface plate, the contacting faces of the blocks being thereby reduced to matching planar faces at predetermined angle to the planar face of the second block and that of the surface plate.

6. A pair of stone blocks, each having a planar face, an inclined surface plate in contacting relation with the face of which the planar faces of the blocks are disposed for relative to and fro sliding motion, and a collecting gutter in the face of the inclined surface plate in overlapping relation with the meeting faces of the stones collecting excessive abrasive material from therebetween and preventing its entry between the planar faces of the stones and the face of the surface plate.

RUDOLPH J. RAHN.
IVAN J. RAHN.

REFERENCES CITED

The following references are of record in the file of this patent:

UNITED STATES PATENTS

| Number | Name | Date |
|---|---|---|
| 418,510 | Fiske | Dec. 31, 1889 |
| 1,261,223 | Eaton | Apr. 2, 1918 |
| 1,486,342 | Hoke | Mar. 11, 1924 |
| 1,486,343 | Hoke | Mar. 11, 1924 |
| 1,491,102 | Hoke | Apr. 22, 1924 |
| 1,502,075 | Weaver | July 22, 1924 |
| 1,514,525 | Hoke | Nov. 4, 1924 |
| 1,660,239 | Stanforth | Feb. 21, 1928 |
| 1,906,954 | Firestein | May 2, 1933 |
| 2,201,454 | Reich | May 21, 1940 |
| 2,361,514 | Tillyer | Oct. 31, 1944 |
| 2,394,610 | Hawkins | Feb. 12, 1946 |
| 2,409,108 | Crowley | Oct. 8, 1946 |
| 2,410,877 | Hall | Nov. 12, 1946 |
| 2,420,606 | McLeod et al. | May 13, 1947 |
| 2,443,194 | Overzat | June 15, 1948 |

OTHER REFERENCES

Amateur Telescope Making, Munn and Co., 4th edition, 1935, pp. 57 and 58.

Amateur Telescope Making, Advanced, Munn and Co., 1946, page 116.